US006963880B1

(12) United States Patent
Pingte et al.

(10) Patent No.: US 6,963,880 B1
(45) Date of Patent: Nov. 8, 2005

(54) SCHEMA EVOLUTION OF COMPLEX OBJECTS

(75) Inventors: Rajendra Pingte, San Mateo, CA (US); Sundeep Abraham, Belmont, CA (US); Mehul Dilip Bastawala, Menlo Park, CA (US); Srinath Krishnaswamy, Fremont, CA (US); Ravikanth Kasamsetty, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 474 days.

(21) Appl. No.: 10/144,439

(22) Filed: May 10, 2002

(51) Int. Cl.[7] .................................................. G06F 7/00
(52) U.S. Cl. .................. 707/103 R; 707/100; 707/102; 707/104.1; 715/500.1; 715/513
(58) Field of Search .................. 707/2, 100–104.1, 707/203; 715/500.1, 513

(56) References Cited

U.S. PATENT DOCUMENTS

| 6,061,690 | A | * | 5/2000 | Nori et al. ............... 707/103 R |
| 6,112,207 | A | * | 8/2000 | Nori et al. .................. 707/101 |
| 6,112,210 | A | * | 8/2000 | Nori et al. ............... 707/103 R |
| 6,119,130 | A | * | 9/2000 | Nguyen et al. ............. 707/203 |
| 6,128,621 | A | * | 10/2000 | Weisz ....................... 707/104.1 |
| 6,185,577 | B1 | * | 2/2001 | Nainani et al. ............. 707/202 |

* cited by examiner

Primary Examiner—Jean Corrielus
Assistant Examiner—Anh Ly
(74) Attorney, Agent, or Firm—Marcel K. Bingham; Hickman Palermo Truong & Becker LLP

(57) ABSTRACT

Schema conversion approaches convert images of complex objects. The schema conversion is performed on images of complex objects belonging to a root class, whether those objects are instances of the root class or instances of a subclass of the root class. A complex object is an object that is comprised of a collection of objects or that has another object as an attribute. The approaches use change vectors to represent changes to make to an image to convert it between the target schema version and source schema version. Change vectors are generated based on schema version records, each of which describes the properties of a schema version, including the attributes in the schema version and the data type of each of the attributes. The approaches evolve changes that includes addition, modification and deletion of object attributes. They convert from an earlier schema version to a later schema version, and vice versa, i.e. from a later schema version to a earlier schema version.

13 Claims, 5 Drawing Sheets

```
PERSON^SP                    PERSON^P {
{                                NAME varchar(20)
    NAME varchar(20)             RESIDENCE ADDRESS
    RESIDENCE ADDRESS        }
}
                             ADDRESS^ta {
ADDRESS^sa                       ADDR1 char(15)
{                                ADDR2 char(15)
    ADDR1 char(15)               POSTALCODE varchar(9)
    ADDR2 char(15)           }
    ZIP number
}
                             EMPLOYEE^e :: PERSON
EMPLOYEE^se :: PERSON        {
{                                SSN number
    SSN number                   POSITION char(10)
    POSITION char(15)        }
}
                CVA [                          _____ Change Vectors 202
                    NAME SAME
                    RESIDENCE MODIFIED
                ]

CVE [
                    ADDR1 SAME
                    ADDR2 SAME
                    ZIP DROPPED
                    POSTALCODE ADDED
                ]

CVS [
                    NAME SAME
                    RESIDENCE MODIFIED
                    SSN SAME
                    POSITION MODIFIED
                ]
```

ColVarray = Varray of Person

302

| |
|---|
| HDR = 3 |
| TYPE-ID$_1$ = PERSON |
| Version$_{11}$ = sp |
| VA[1].NAME |
| Version$_{12}$ = sa |
| VA[1].ADDR1 |
| VA[1].ADDR2 |
| VA[1].ZIP |
| TYPE-ID$_2$ = EMPLOYEE |
| Version$_{21}$ = se |
| VA[2].NAME |
| Version$_{22}$ = sa |
| VA[2].ADDR1 |
| VA[2].ADDR2 |
| VA[2].ZIP |
| VA[2].SSN |
| VA[2].POSITION |
| TYPE-ID$_3$ = PERSON |
| Version$_{31}$ = sp |
| VA[3].NAME |
| Version$_{32}$ = sa |
| VA[3].ADDR1 |
| VA[3].ADDR2 |
| VA[3].ZIP |

SCHEMA EVOLUTION OF COMPLEX OBJECTS

RELATED APPLICATION

The present invention is related to U.S. application Ser. No. 08/624,191, Method And Apparatus For Providing Schema Evolution Without Recompilation, filed by Tin Anh Nguyen, et al. on Mar. 28, 1996, which issued as U.S. Pat. No. 6,119,130 on Sep. 12, 2000.

FIELD OF THE INVENTION

The present invention relates to converting images of objects between different versions of the inheritable objects' class.

BACKGROUND OF THE INVENTION

A relational database management system (DBMS) allows entities to be modeled according to the relational paradigm, where entities are modeled in terms of tables with columns and rows. An object-relational DBMS allows entities to be modeled according to the object-oriented paradigm, where entities are modeled as instances of an object class.

An object class is associated with one or more attributes and zero or more methods. These attributes may be include primitive data types, other object classes, or collections.

Object classes are defined by database metadata. The database metadata may be created in response to commands issued by a user defining the object classes. In this way, the attributes of an object class may be specified by a user.

Instances of an object class are known as "objects". Each object contains values for its attributes. The values of the attributes are collectively referred to as the object's state. Each object that is an instance of a particular object class has the same attributes. The methods associated with an object (i.e., methods associated with the object class of the object) operate upon the state of an object. Methods associated with an object class may also be referred to herein as routines.

Approaches for Storing Object Data

The data for objects may be stored in a database using a variety of approaches. One such approach is referred to herein as the "normalized approach." According to the normalized approach, a table stores the data of objects, each row of the table holding the data for a particular object. One or more columns of the table each correspond to an attribute of an object class. For a given row that holds data for an object, one or more columns of the row hold a value for the corresponding attribute of the object.

Examples of tables used under the normalization approach include object tables and object-relational tables. An object table is referred to as being typed as an object class. That is, each row of an object table is an object of that object class, and holds the attribute values for the object.

An object-relational table is not typed as an object, but contains at least one column typed as an object class ("object column"), and may contain other columns not defined as object types, e.g. numerals, strings. The object column logically holds "column objects", which are instances of the column's object class. Column objects are presented to users as encapsulated entities with attribute values. However, under the normalization approach, the attribute values for column objects are stored in internal columns that are "invisible" to the end user. Each internal column corresponds to an attribute of the object column.

Linearized Objects

Another approach for storing data for objects is referred to as the "linearized approach." Under the linearized approach, the attribute values of an object are stored linearly in a sequence of bytes; the sequence can be stored persistently as a single data item. The sequence of bytes is referred to herein as an image.

Quite literally, the image of an object is a one-dimensional representation. One or more bytes of an image represent an attribute value. The image also includes information on how the data should be "arranged" in-memory (for example, in arrays or user-defined structures). This information is needed later, to read the data back into memory or extract attribute values from the image. For example, an image may contain a type identifier, which identifies an object class. Delimiters contained in an image may separate the values.

Linearized objects may be used to represent complex objects. A complex object is an object that is comprised of a collection of objects or that has another object as an attribute. One example of a complex object is a VARRAY. A VARRAY is an unbounded array whose array elements have the same data type or belong to the same "base class". VARRAYs are stored in a table column. The column is referred to as being typed as a VARRAY containing objects belonging to the base class.

Schema Evolution

The way entities are modeled by object classes may change over time. This may require that an object class be changed. For example, an object class STUDENT is used to model students. Changes in federal regulations mandate that previously untracked student information must be tracked for some students. To accommodate this new requirement, an attribute is added to the object class STUDENT.

Changing an object class requires creating a new version of the object class. All of the versions of an object class are referred to as a schema. A particular version of an object class is referred to as a schema version. The process of moving from one version to another version is referred to as schema evolution.

In order to access an object, other processes, including application software and various software components of a database system, expect and need objects to be presented in a format that is different than a linearized format. The process of converting a linearized image into a different type of format is referred to herein as decoding. Conversely, the process of converting another type of format to a linearized type of format is referred to herein as encoding.

Decoding processes need to know the format of an image. This format is dictated by the schema version of the image. Thus, correctly decoding an image requires knowing the schema version of the image.

Software may be designed for an earlier schema version or a later schema version. As a result, a two pronged problem may arise when decoding an image for an object: (1) software may expect a schema version that is older than the object's schema version; and (2) the software may expect a schema version that is newer than the object's schema version. This type of problem is referred to herein as schema incompatibility.

To address this problem, schema conversion mechanisms have been developed that convert an image to a schema version expected by software. Such mechanisms are described in Method And Apparatus For Providing Schema Evolution Without Recompilation. Basically, these mechanisms determine the schema version ("target version") expected by a software package and the schema version ("source version") of objects accessed by the software packages, and convert the image to the target version based on metadata that tracks each schema version of the object.

Schema Version Mechanisms Have not Kept Up with Advances In Object-Oriented Technology There have been advances in object oriented technology. Unfortunately, while software has been developed that exploits the full power of these advances, conventional schema conversion mechanisms have lagged behind. Images created or processed by software using these advances in object-oriented technology cannot be handled by conventional schema conversion mechanisms. For example, through an object oriented feature known as "inheritance", classes ("subclasses") may be derived from a "root class." A subclass has all the attributes of a root class. In addition, a subclass may define additional attributes, methods, and method implementations. Unfortunately, schema conversion mechanisms are unable to convert images that represent instances of subclasses, when the image is stored in a data structure defined to hold objects of a root class. For example, conventional schema conversion mechanisms cannot convert an image in a VARRAY that is an instance of a subclass of the base class of the VARRAY.

As a result, a computer user must resort to manually intensive and expensive approaches to solve the problem of schema incompatibility. One such approach is the batch conversion approach. Under the batch conversion approach, the software and data are converted to use the latest schema version. Converting the software is expensive and burdensome, requiring re-programming, re-compiling, and re-deploying the software. Converting the image data to a newer schema is also expensive and burdensome, as illustrated by the following example.

A table F has a column F.v, which is typed as a VARRAY that can hold instances of PERSON or its subclasses, say EMPLOYEE. A schema version is created by adding a new attribute to PERSON and EMPLOYEE. Converting the image data to a new schema version involves creating a temporary table to hold data from table F, redefining table F, and then transferring data from the temporary table back into table F.

Specifically, a new table TMP is created and a temporary root class and subclasses are created. The temporary root class has the same attributes as PERSON. Each of the temporary subclasses corresponds to a particular subclass of PERSON. Each temporary subclass has the same attributes as its corresponding subclass of PERSON. The new table has the same definition as table F, with the following exception. A column that corresponds to F.v, named TMP_PERSON, is typed as a VARRAY holding objects of the temporary root class and its subclasses. After creating table TMP, rows in table F are inserted into table TMP.

Table F is then redefined to have a VARRAY that can hold instances of a new schema version of PERSON or its subclasses, including EMPLOYEE. Specifically, table F is dropped from the database. A new schema version of PERSON and EMPLOYEE is created, each of which define, in addition to the previous attributes, the new attribute. Next, table F is re-created, having the same column definition as before, including F.v, which is typed as a VARRAY holding objects of the new schema version PERSON and its subclasses, including the new schema version of EMPLOYEE.

Finally, data is transferred from the temporary table to the new version of table F. Specifically, rows are extracted from TMP. For each row, the attribute values of the old objects stored in the VARRAY of column F.v are used to create new objects of the type PERSON or a subclass. The value of the new attribute of PERSON for a new object is set to a new value, which may be a default value, such as NULL. Each old object is examined to determine whether it is subclass EMPLOYEE. If it is, then the value of the new attribute of EMPLOYEE for a new object is set to a new value, which may be a default value, such as NULL. The value of the new attribute for a new object is set to a new value, which may be a default value, such as NULL. The VARRAY, with its new objects, and values from other columns in the extracted row, are inserted into the new row.

Because of the great expense of the batch conversion approach, computer users defer or forego schema evolution, or avoid using advances in object oriented technology to develop software, and are thus denied full realization of the advances in object-oriented technology. Clearly, it is desirable to provide a schema conversion mechanism that handles images created for object classes developed using advances in object oriented technology.

SUMMARY OF THE INVENTION

Described herein are schema conversion approaches that convert images of complex objects, the objects stored and processed in a way that exploits object-oriented features. According to an aspect of the present invention, the schema conversion is performed on images of objects belonging to a root class, whether those objects are instances of the root class or instances of a subclass of the root class. An example of such a data structure is an image of a VARRAY that is defined to hold objects belonging to the base class of the VARRAY. The objects contained in the VARRAY may be an instance of the base class or an instance of a subclass of the base class.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a diagram of versions of object classes and data structures used to describe changes to those object classes according to an embodiment of the present invention;

FIG. 3 is a diagram of an image according to an embodiment of the present invention;

DETAILED DESCRIPTION OF THE INVENTION

A method and apparatus for schema conversion is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Described herein are schema conversion approaches that convert images of complex objects created using various object-oriented features. In particular, the schema conversion approaches allow conversion of images of objects belonging to a root class, whether those objects are instances of the root class or instances of the subclass of the root class. An example of such a data structure is an image of a VARRAY that is defined to hold objects belonging to the base class of the varray. The objects contained in the VARRAY may be an instance of the base class or an instance of a subclass of the base class.

Illustrative DBMS

Figure 1:
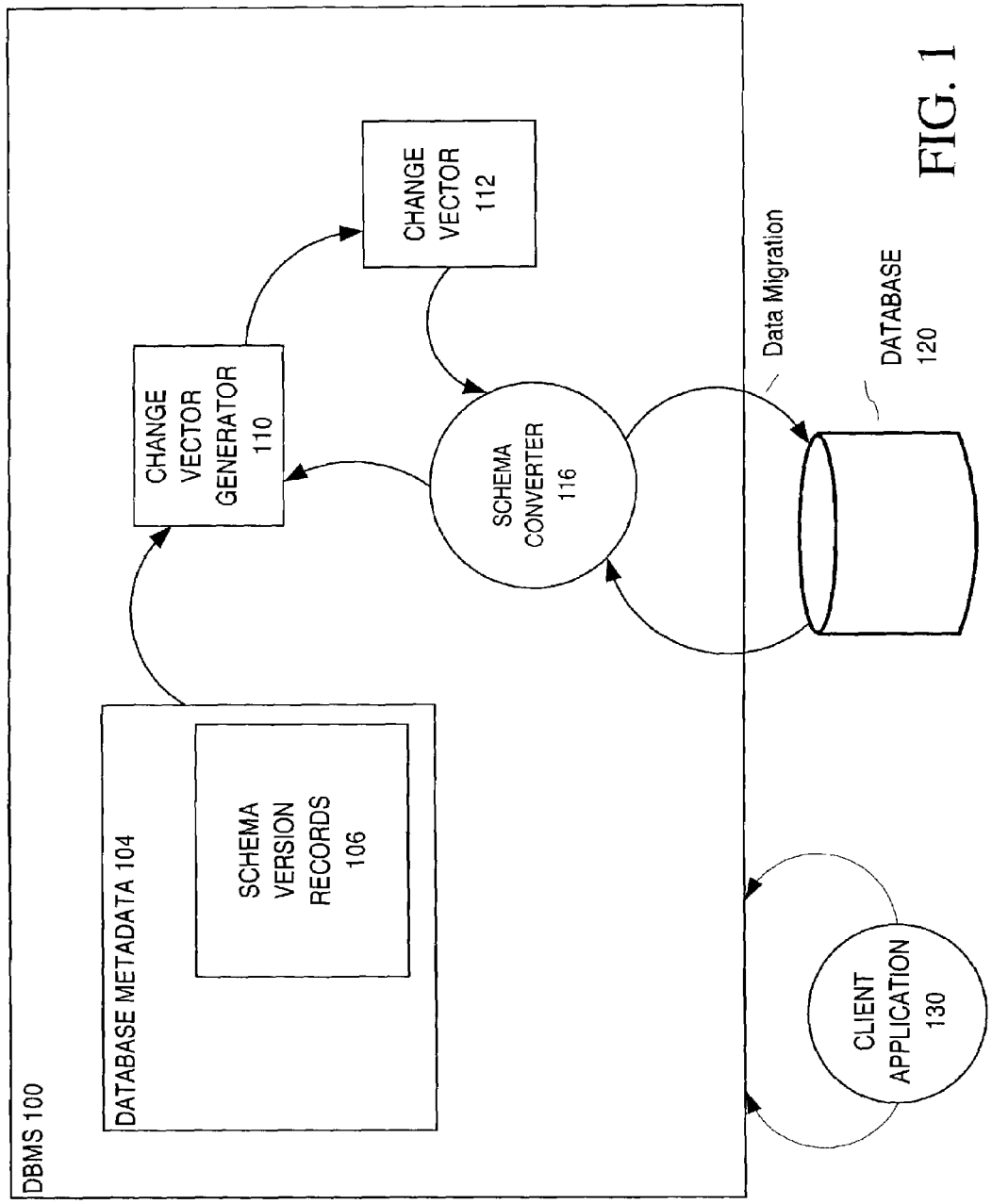
FIG. 1 is a database system that may be used to implement an embodiment of the present invention.

FIG. 1 is a block diagram depicting a DBMS used to illustrate an embodiment of the present invention. FIG. 1 depicts DBMS 100, which manages data stored in database 120. Database metadata 104 is metadata defining the configuration of DBMS 100 and various entities managed by DBMS 100. Among these entities are database objects, including relational tables, object tables, object relational tables, views, stored procedures, and object classes. Database metadata 104 is generated by DBMS 100 in response to receiving Data Definition Language commands. Database 120 is a persistent store that holds data stored in various database objects. This data includes table data and object data, including images.

Also within database metadata 104 are schema version records 106. A schema version record defines a schema version of an object class. The schema version record for a particular schema version includes format data that describes the properties of the schema version, including the attributes in the schema version and the data type of each of the attributes. When a new version of an object class is created, a new schema version record is added to schema version records 106. The new schema version record includes format data that describes all of the attributes of the new version of the object class. The new schema version record is then associated with the existing schema version records that correspond to other versions of the same object class. Examples of schema version records shall be described.

Schema converters 116 is representative of processes running on DBMS 100 that convert an image from one schema version to another schema version. For example, schema converters 116 are representative of a conversion process that converts an image for an object that is requested by client application 130. The application expects an object belonging to a particular schema version. When the object's image is formatted according to a different schema version, the data in the image is converted to the expected schema version before the object is supplied to client application 130.

A schema converter can also be a data migration process. A data migration process converts a stored image to a new schema version when the image is accessed in a particular way. The converted image is then stored in place of the previous version of the image. Images are converted in this way when, for example, a database application expecting the newer version either requests or updates the objects of the images.

To convert between schema versions, information identifying the changes that occurred between schema versions is needed. Such information is supplied by change vectors 112. Each change vector of change vectors 112 is associated with a source schema version and a target schema version. A change vector specifies the changes to make to an image to convert it between the target schema version and source schema version. With respect to the target schema version, the source schema version may be an earlier or later version of the schema. A change vector is generated by processes that execute change vector generator 110. Change vector generator 110 is representative of one or more software components (e.g., functions, modules, procedures) that are invoked by a process to generate a change vector. For example, a schema converter converting an image invokes a change vector generator in the form of a function, passing in as parameter values data that identifies an object class, a source schema version, and a target schema version.

Change vectors are generated by examining schema version records to determine the attributes that have been added, deleted, modified, or left unchanged between a source schema version and a target schema version. A change vector includes data that identifies the attributes that have been added, deleted, modified, or left unchanged between schema versions.

Illustrative Schema Version and Change Vectors

FIG. 2 depicts illustrative schema versions and change vectors used to illustrate an embodiment of the present invention. Referring to FIG. 2, it shows schema versions $PERSON^{sp}$ and $PERSON^{tp}$ for object class PERSON, schema version $ADDRESS^{sa}$ and $ADDRESS^{ta}$ for object class ADDRESS, and schema version $EMPLOYEE^{SE}$ and $EMPLOYEE^{te}$ for object class EMPLOYEE, which is a subclass of object class PERSON.

Schema version $PERSON^{sp}$, $ADDRESS^{sa}$, $EMPLOYEE^{SE}$ are later versions of schema version $PERSON^{tp}$, $ADDRESS^{ta}$, and $EMPLOYEE^{te}$, respectively. These later versions are the result of direct or indirect changes to the definitions of object classes PERSON, ADDRESS, and EMPLOYEE, the changes being described in table C below.

Schema versions are herein referenced according to the following notation, which is explained using schema version $PERSON^{sp}$. 'PERSON' identifies the object class for the schema. The superscript 'sp' is a version identifier that identifies the schema version. The schema version identifier uniquely identifies a schema version relative to other schema versions in a schema.

'PERSON' contains the attributes NAME and RESIDENCE. Attribute NAME is typed as a variable length string having 0 to 20 characters. Attribute RESIDENCE is typed as an object that is an instance of object class ADDRESS. Attribute RESIDENCE is referred to as an embedded object because RESIDENCE is an attribute defined as an object. Likewise, ADDRESS is referred to as an embedded class with respect to object class PERSON because class PERSON has an attribute that is defined as an object belonging to object class ADDRESS. For the same reason, object class PERSON is referred to as a "containing class" with respect to object class ADDRESS; an instance of class PERSON is referred to as containing the embedded object RESIDENCE.

Schema version $ADDRESS^{sa}$ defines attributes ADDR1, ADDR2, and ZIP. Attribute ADDR1 is defined as a fixed length string of 15 characters, ADDR2 as a fixed length string of 15 characters, and ZIP as a number.

Schema version EMPLOYEE$^{se}$ defines, in addition to the attributes inherited from PERSON, attributes SSN and POSITION. Attribute SSN is defined as a number, and attribute POSITION is defined as a fixed length string of 15 characters.

The changes to the object classes PERSON, ADDRESS, and EMPLOYEE are shown below in table C.

TABLE C

| OBJECT CLASS | ATTRIBUTE CHANGE |
| --- | --- |
| ADDRESS | ZIP is dropped from the definition |
| ADDRESS | POSTALCODE is added as a variable length string |
| EMPLOYEE | POSITION modified to a shorter fixed length string |
| PERSON | RESIDENCE modified due to changes to the definition of class E |

As indicated by table C, a change to an embedded class is also a change to the containing object class. A change to an embedded class creates a new schema version for the classes that contain the embedded class.

Referring again to FIG. 2, schema version PERSON$^{tp}$ defines attribute NAME as a variable length string, as before. Attribute RESIDENCE remains defined as an object of class ADDRESS, but according to the format defined by schema version ADDRESS$^{ta}$.

Schema version ADDRESS$^{ta}$ continues to define attributes ADDR1 and ADDR2. Attribute ZIP is no longer defined, while attribute POSTALCODE is added as a fixed length character string of 9 characters.

Schema version EMPLOYEE$^{te}$ defines SSN as a number. Attribute POSITION is defined as a fixed length string of 10 characters.

Change vectors 202 include change vectors CVA, CVE, and CVS. These change vectors describe the changes to an object class between a source schema version and a target schema version. This information is needed to convert an image between a source schema version and a target schema version.

Change vector CVA describes the changes to object class PERSON between the source schema version PERSON$^{sp}$ and target schema version PERSON$^{tp}$. CVA specifies that attribute NAME is the same (i.e. has not been changed), and RESIDENCE has been modified. When an embedded class is changed, a change vector for the containing class specifies that the attribute corresponding to the embedded class has been modified.

Change vector CVE describes the changes to object class ADDRESS between source schema version ADDRESS$^{sa}$ and target schema version ADDRESS$^{ta}$. Accordingly, CVE specifies that attributes ADDR1 and ADDR2 are the same, attribute ZIP has been dropped, and that attribute POSTALCODE has been added.

Change vector CVS describes the changes to object class EMPLOYEE between source schema version EMPLOYEE$^{se}$ and target schema version EMPLOYEE$^{te}$. Accordingly, CVS specifies that NAME is the same, RESIDENCE has been modified, SSN is the same, and POSITION has been modified.

Change vectors may specify more information than depicted by FIG. 2; however, for purposes of exposition, other types of information are not depicted. Such information may be the feature or property of an attribute that was modified. For example, CVS may specify that the length of POSITION was changed from 15 characters to 10.

Illustrative Image

FIG. 3 is a block diagram depicting the format of an image for a VARRAY used to illustrate an embodiment of the present invention. Referring to FIG. 3, image 302 is an image of VARRAY VA. VA is a column object in column ColVARRAY. Definition 304 shows that ColVARRAY is typed as a VARRAY holding objects belonging to object class PERSON.

Image 302 is depicted as a table with segments. Each table segment corresponds to a sequence of one or more bytes that either is (1) data representing an object attribute value, or (2) metadata describing information about the VARRAY or an object. Each of the sequences of bytes is referred to as an image segment.

Image segment HDR is an example of metadata that defines the number of objects in VARRAY VA. HDR contains the value of 3, which denotes that VARRAY VA contains 3 objects.

Following HDR are the image segments that describe the three objects in VA. The objects include VA[1], VA[2], and VA[3]. Each of these objects are represented by a group of contiguous segments referred to as a segment set. Segment set 312 represents VA[1], segment set 314 represents VA[2], and segment set 316 represents VA[3].

A segment set is lead by an image segment referred to as a type identifier. A type identifier identifies an object class of the object represented by the segment set. TYPE-ID$_1$, for example, identifies object class PERSON, the object class of VA[1].

Following TYPE-ID$_1$ is image segment version$_{11}$. Version$_{11}$ is a schema version identifier, which identifies the schema version of the object represented by a segment set. Version$_{11}$ identifies schema version sp.

VA[1] NAME is an image segment representing the value of attribute NAME of VA[1].

As mentioned earlier, an object may have an embedded object as an attribute. Like the objects that contain them, an embedded object is associated with a schema version. Version$_{12}$ is a version identifier that identifies the schema version of embedded object RESIDENCE of VA[1].

Following version$_{12}$ are image segments VA[1].ADDR1, VA[1].ADDR2, and VA[1].ZIP. VA[1].ADDR1, VA[1].ADDR2, and VA[1].ZIP represent the values of attributes ADDR1, ADDR2, and ZIP of embedded object RESIDENCE of VA[1].

Substituted Subclass Instance

After the segment set for VA[1] is segment set 314 which is for VA[2]. Type-ID$_2$ identifies the object class VA[2] as EMPLOYEE, a subclass of PERSON. The inclusion of VA[2] in VARRAY VA is a demonstration of the object-oriented principle of substitutability. The principle of substitutability refers to the ability to process an instance of a subclass as if it is an instance of the root class of the subclass. In accordance with this principle, any subclass of object class PERSON, such as EMPLOYEE, may be added to VA.

Another example of the application of substitutability is an object reference. An object reference is a reference that refers to an object belonging to a particular object class. Under the principle of substitutability, an object reference may refer to an instance of the reference's object class, or any of its subclasses.

A corollary to substitutability is that when an object reference refers to an instance of a subclass, the attributes and methods defined for the root class are visible while those of the subclass are not. For example, an object reference ORA is defined as an object reference to object class PERSON. ORA in fact refers to VA[2], which belongs to subclass EMPLOYEE, a subclass of PERSON. Using ORA, attribute NAME may be referenced as ORA.NAME, but SSN may not be referenced as ORA.SSN.

In some object-oriented systems, there is an adjunct to substitutability. Substituting an object of a subclass as an instance of the subclass's root class should not affect the ability to later process the object as an instance of the subclass. For example, in addition to ORA, an object reference ORS is defined as an object reference to an instance of object class EMPLOYEE. Under the adjunct, using ORS, not only may NAME be referenced as ORS.NAME, SSN may also be referenced as ORS.SSN.

For these reasons, it is not only important that image 302 represent the values for attributes defined by root class PERSON in image 302, but also values for the attributes of subclass EMPLOYEE for any instance of EMPLOYEE represented in VA. Thus, the segment set for VA[2] contains image elements that not only represent the values of attributes defined by PERSON, but the subclass EMPLOYEE as well.

Similar to segment set 312, the segment set 314 includes $version_{21}$, which identifies schema version se as the schema version of VA[2]. VA[2].NAME represents the value of attribute NAME. $Version_{22}$ identifies the schema version of embedded object RESIDENCE, which is schema version sa.

In addition, segment set 314 includes image segments for the attributes defined by schema version se. These are VA[2].SSN and VA[2].POSITION, which represent the values for SSN and POSITION, respectively.

In an embodiment of the present invention, it is possible that in a system that supports substitutability for objects stored in VARRAYS, that some VARRAYS do not in fact contain any instances of a subclass of the base class. In these cases, it is not necessary to include a type identifier for each object contained in the image of a VARRAY. Instead, the object class of all objects in a VARRAY may be determined by referencing database metadata to determine the base class. Furthermore, the VARRAY image may contain an "inheritance flag," to flag whether or not a VARRAY has instances of a subclass of the base class.

For purposes of simplicity and exposition, not all types of information that may be stored in an image have been illustrated. Such information may include delimiters or the inheritance flag described above. In addition, metadata about a particular object may be stored in a sequence of one or more bytes referred to as an object descriptor, which may contain such information as an object's class or schema version. A descriptor may contain other information, such as an offset indicating the number of bytes that are used in a segment set to represent an object.

Exemplary Image Conversion

Figure 4:
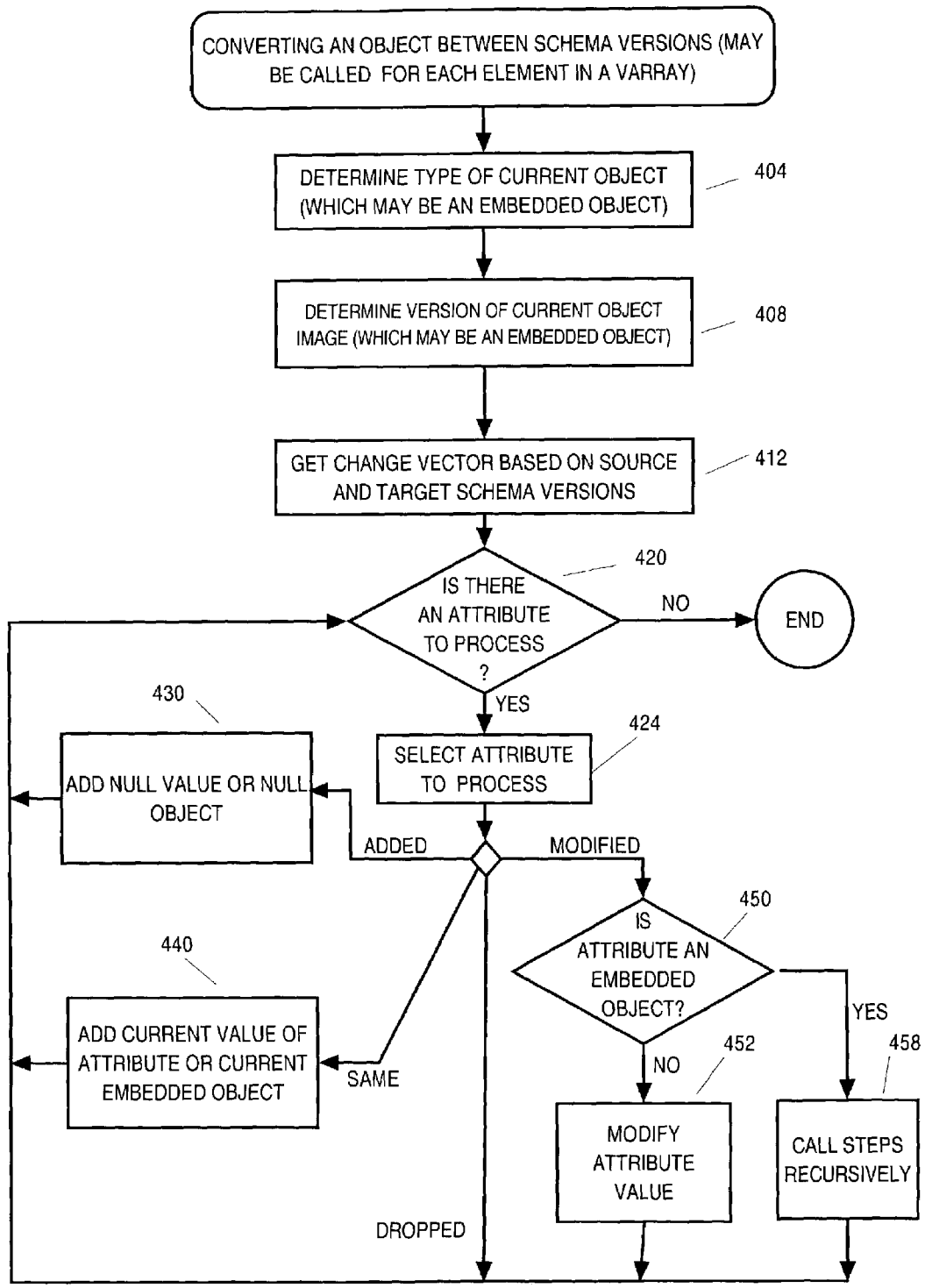
FIG. 4 is a diagram of a schema conversion process according to an embodiment of the present invention.

FIG. 4 shows a schema conversion process for converting an image from a source schema version to a target schema version. The process produces a "target image" formatted according to a target schema version. Change vectors are generated to determine how to convert a source image into a target image. The process may be used to convert the image of a simple object, or complex objects, such as objects that contain embedded objects and VARRAYS, and objects of subclasses. The target image may then be used in place of the source image, by, for example, persistently storing the target image in place of the source image.

The process shown in FIG. 4 is illustrated using image 302 and DBMS 100. The process is performed iteratively, that is, the process is performed for each segment set in image 302. The number of iterations performed is 3, the value of HDR. The first segment set to be processed is the segment set for VA[1].

The steps refer to the current object, which, for practical purposes, is the object whose current scalar values are being processed. A current object may be an embedded object. Scalar values are values of native data types supported by DBMS 100, in other words, data types that are not user defined.

Referring to FIG. 4, at step 404, a schema converter determines the object class of the current object. The determination is made by examining the value in $TYPE-ID_1$, which is PERSON.

At step 408, the schema converter determines the source schema version of the current object, by examining the value in $version_{11}$, which identifies schema version sp.

At step 412, the schema converter gets a change vector ("current change vector") for the object class and target schema version of the current object, and the source schema version. If the change vector has not been generated for the object class, source schema version, and target schema version, the schema converter invokes change vector, generator 110, passing in the object class, source schema version, and target schema version, which in this illustration are PERSON, se, te, respectively. In response, change vector generator 110 returns change vector CVA. CVA is then retained in memory, where in a subsequent execution of step 412, the schema converter may simply access CVA in memory.

Step 420 is a determination that controls whether the schema converter repeats a loop of execution. The path is executed for each attribute listed in CVA.

At step 420, it is determined whether there is another attribute listed in the current change vector to process. If all attributes listed have been processed, execution of the steps ends. If, however, not all attributes have been processed, then an attribute is selected at step 424. After step 424, execution proceeds along one of four paths of execution depending on whether the selected attribute was added, dropped, modified, or left unchanged. If the selected attribute was added, then execution proceeds to step 430.

In the current example, the selected attribute is NAME. Attribute NAME is the same in both the source version and the target version; execution therefore proceeds to step 440. At step 440, the current attribute value is added to the target image, or, if the attribute is an embedded object, the embedded object is added to the target image. Specifically, the target image is modified so that it represents that the attribute value is the current attribute value, or, if the attribute is an embedded object, that the attribute is the current embedded object.

In the current example, the current value of NAME is added to the target image. Execution proceeds along to step 424, where the attribute selected is RESIDENCE. Because RESIDENCE was modified, execution proceeds to step 450.

At step 450, it is determined whether the modified attribute is an embedded object or scalar data type. If it is an embedded object, execution then flows to step 458.

At step 458, the schema conversion process is called recursively, with the embedded object established as the current object. As those skilled in the art recognize, to execute the schema conversion process recursively, the schema conversion process may be implemented as a function which calls itself.

In the current example, after recursively invoking the function which implements the schema conversion process, execution commences to step 404. Here, the schema converter determines that the object class of the current image is ADDRESS. The determination is made by examining the schema version sa to determine the object class of the embedded object attribute RESIDENCE. At step 408, the schema converter determines the schema version of the current image, by examining the value in $Version_{12}$, which identifies schema version sa.

At step 412, the schema converter gets the change vector CVB, using the schema version determined at step 408 as the source schema version. At step 424, the schema converter selects ADDR1 as the attribute to process, and processes ADDR1 in a manner similar for NAME because ADDR1 has not changed. The attribute ADDR2 is then selected at step 424, and is processed similarly because it has not changed.

Next, at step 424, attribute ZIP is selected. Attribute ZIP has been dropped, and therefore execution proceeds back to step 420. No value or object is added to the target image.

At step 424, attribute POSTALCODE is selected. Attribute POSTALCODE has been added, therefore execution proceeds to step 430. At step 430, a null value or null object is added to the target image for the attribute. A null object is an object whose attributes are set to a null value or null object. In this illustration, a null value is added.

At step 420, it is determined that there is no attribute to process for the current object, execution of the steps end for the current object. Control returns to step 458, where the current object becomes the containing object VA[1].

At step 420, it is determined that there is no attribute to process. Execution of the steps end for the current object. The schema conversion process is invoked for the next object in VA, which is VA[2].

Execution proceeds in a manner similar to that described for VA[1], except as follows. At step 404, the schema converter determines that the type of the current image is subclass EMPLOYEE. The determination is made by examining the value in $TYPE-ID_2$. At step 412, the schema converter gets change vector CVS, the source and target schema versions being schema version se and te.

Attributes NAME and RESIDENCE are processed in a similar way as that described for VA[1]. In addition, the additional subclass attributes of SSN and POSITION are processed. Because SSN has not changed, at step 440, the current value for SSN is stored in the target image.

At step 424, attribute POSITION is selected. Control then flows to step 450 because POSITION has been modified. At step 450, it is determined that POSITION is a scalar value (i.e. fixed length character string), therefore control flows to step 452.

At step 452, the schema converter modifies the attribute value. How the attribute value is modified depends on how the attribute's type has been modified. For example, POSITION has been modified to a fixed length character string with a smaller number of characters. The value is modified by truncating characters and storing it as a character string in the target image. Alternatively, the attribute value may be modified by simply storing a null value for the attribute in the target image.

Converting from a Latter Schema Version to an Earlier Schema Version

The techniques explained in the preceding sections can be applied easily to convert an image from a latter schema version to an earlier schema version. Consider the opposite scenario of FIG. 2. We convert from PERSON-tp to PERSON-sp, ADDRESS-ta to ADDRESS-sa and EMPLOYEE-te to EMPLOYEE-se. The changes are described in the table below.

TABLE D

| OBJECT CLASS | ATTRIBUTE CHANGE |
| --- | --- |
| ADDRESS | ZIP is added to the definition |
| ADDRESS | POSTALCODE is dropped from the definition |
| EMPLOYEE | POSITION modified to a longer fixed length string |
| PERSON | RESIDENCE modified due to changes to the definition of class E |

Then the appropriate change vectors need to be created from Table D, and the procedure of FIG. 4 needs to be applied to convert image segments from PERSON-tp to PERSON-sp, ADDRESS-ta to ADDRESS-sa and EMPLOYEE-te to EMPLOYEE-se respectively.

ADVANTAGES AND ALTERNATE EMBODIMENTS

The conversion schema process shown in FIG. 4 has multiple advantages. Among these advantages is the ability to retain the subclass attribute values of any object in a VARRAY or other complex object. Another advantage is the ability to convert objects to a target schema version even when some belong to different source schema versions before undergoing conversion. A third advantage is not only being able to convert from an earlier schema version to later schema version but also vice versa, i.e. to convert from a later schema version to an earlier schema version.

The present invention is not limited to converting the schema version of object collections stored in a VARRAY. For example, an object column of a table may be typed as an object class that holds objects belonging to that object class. The rows of the table contain images that represent the values of an object belonging to the object class. The column may hold objects that are instances of the object class, or a subclasses of the object class. Each of the images contain a type identifier. A process similar to that depicted by FIG. 4 may be used to convert the objects in the column object to a target schema version.

Hardware Overview

Figure 5:
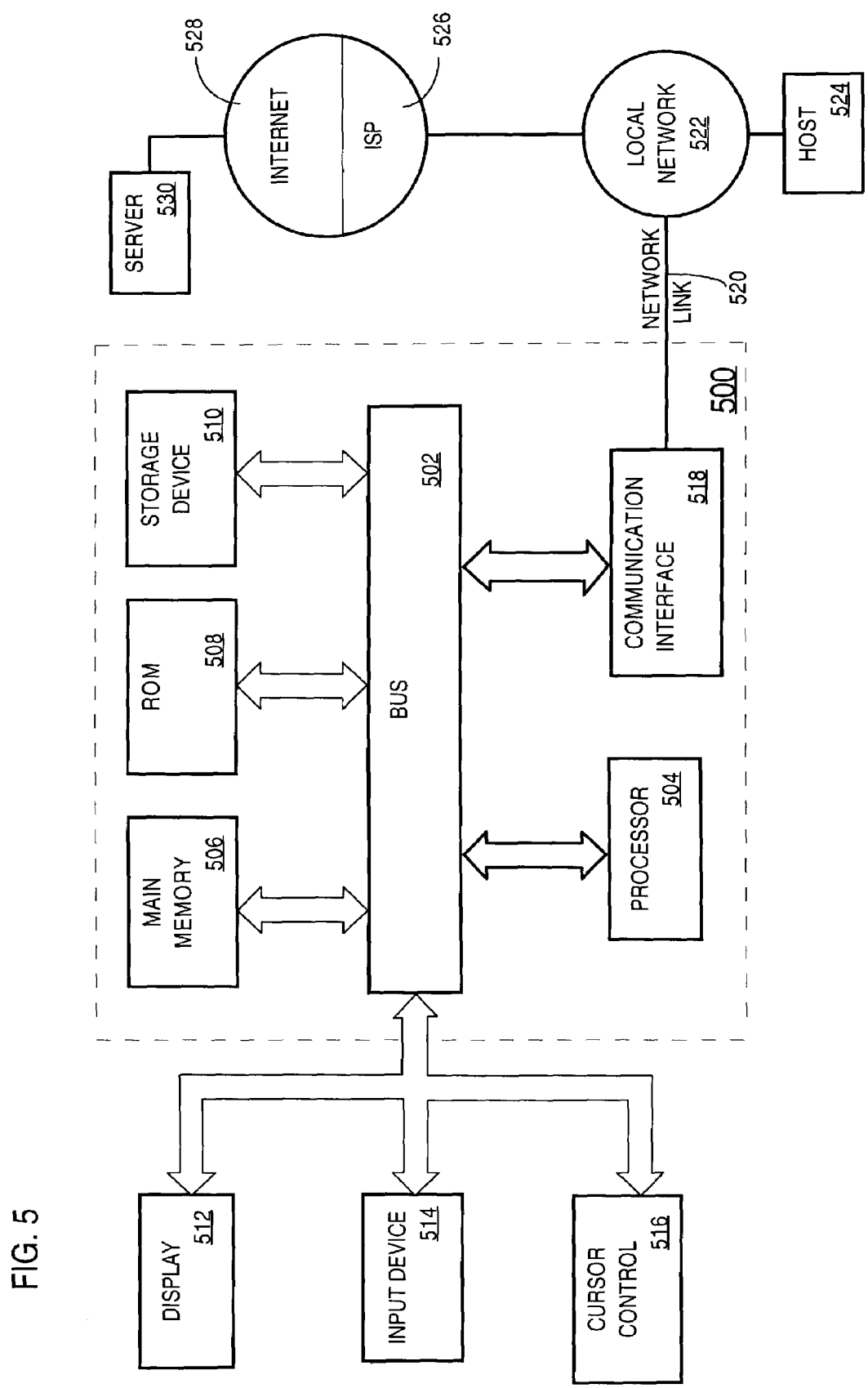
FIG. 5 is a computer system that may be used to implement an embodiment of the present invention.

FIG. 5 is a data item diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic persistent storage or optical persistent storage, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic persistent storages, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of converting linearized images, the method comprising the steps of:

accessing a data structure that holds an image of an object of a root object class and an image of an object of a particular object subclass of the root object class;

wherein said data structure is defined by metadata as an array with elements, each element of the array belonging to said root object class, each image in the data structure representing an element of the array;

for each image in the data structure, determining whether said each image represents an object belonging to a particular version of said root object class or to a particular version of a particular subclass of the root object class;

when said each image represents a particular version of said root object class, then:
  examining the metadata to determine one or more changes made to said root object class between the particular version of said root object class and a second version of said root object class, and
  generating a target image for said each image based on the one or more changes made to said root object class between the particular version of said root object class and a second version of said root object class;
when said each image represents a particular version of the particular subclass, then:
  examining the metadata to determine one or more changes made to said particular subclass between the particular version of said particular subclass and a second version of said particular subclass, and
  generating a target image for said each image based on the one or more changes made to said particular subclass between the particular version of said particular subclass and a second version of said particular subclass,
wherein
  at least one image in said data structure includes a type identifier that identifies the object class of said image, and wherein
  the step of determining whether said each image represents an object belonging to a particular version is based on the type identifier included in the at least one image.

2. The method of claim 1, further including the step of storing target images generated for images in said data structure in place of said images.

3. The method of claim 1, wherein the step of accessing a data structure includes accessing a data structure that represents a VARRAY that has as a base class said root object class.

4. The method of claim 3, wherein said data structure is stored in a table column defined by said metadata to hold VARRAYS having said base class;
  wherein said column includes another data structure representing another VARRAY; and
  wherein the other data structure holds only images of said root object class and does not contain a type identifier identifying an object class.

5. The method of claim 1, wherein:
particular subclass, defines an attribute not defined by said root object class; and
wherein the step of generating a first target image includes generating data representing a value for said attribute.

6. The method of claim 1, wherein the particular version of said root object class is a version of said root object class that is later than said second version of said root object class.

7. The method of claim 1, wherein the particular version of said particular subclass is a version of said particular subclass that is later than said second version of said particular subclass.

8. The method of claim 1, wherein one or more changes made to said root object class and one or more changes made to said particular subclass, together include modification, deletion, or addition of one or more attributes.

9. A computer-readable medium carrying one or more sequences of instructions for converting linearized images, wherein execution of the one or more sequences of instructions by one or more processors causes the one or more processors to perform the steps of:

accessing a data structure that holds an image of an object of a root object class and an image of an object of a particular object subclass of the root object class;
wherein said data structure is defined by metadata as an array with elements, each element of the array belonging to said root object class, each image in the data structure representing an element of the array;
for each image in the data structure, determining whether said each image represents an object belonging to a particular version of said root object class or to a particular version of a particular subclass of the root object class;
  when said each image represents a particular version of said root object class, then:
    examining the metadata to determine one or more changes made to said root object class between the particular version of said root object class and a second version of said root object class, and
    generating a target image for said each image based on the one or more changes made to said root object class between the particular version of said root object class and a second version of said root object class;
  when said each image represents a particular version of the particular subclass, then:
    examining the metadata to determine one or more changes made to said particular subclass between the particular version of said particular subclass and a second version of said particular subclass, and
    generating a target image for said each image based on the one or more changes made to said particular subclass between the particular version of said particular subclass and a second version of said particular subclass, and
  wherein
    at least one image in said data structure includes a type identifier that identifies the object class of said image, and wherein
    the step of determining whether said each image represents an object belonging to a particular version is based on the type identifier included in the at least one image.

10. The computer-readable medium of claim 9, the steps further including storing target images generated for images in said data structure in place of said images.

11. The computer-readable medium of claim 9, wherein the step of accessing a data structure includes accessing a data structure that represents a VARRAY that has as a base class said root object class.

12. The computer-readable medium of claim 9, wherein said data structure is stored in a table column defined by said metadata to hold VARRAYS having said base class;
  wherein said column includes another data structure representing another VARRAY; and
  wherein the other data structure holds only images of said root object class and does not contain a type identifier identifying an object class.

13. The computer-readable medium of claim 9, wherein:
said particular subclass defines an attribute not defined by said root object class; and
wherein the step of generating a first target image includes generating data representing a value for said attribute.

* * * * *

UNITED STATES PATENT AND TRADEMARK OFFICE
CERTIFICATE OF CORRECTION

PATENT NO.   : 6,963,880 B1                                      Page 1 of 1
DATED        : November 8, 2005
INVENTOR(S)  : Pingte et al.

It is certified that error appears in the above-identified patent and that said Letters Patent is hereby corrected as shown below:

Column 14,
Line 54, replace "A Method of converting linearized images," with -- A computerized-implemented method of converting linearized images --;

Column 15,
Line 48, replace "particular subclass," with -- said particular subclass --.

Signed and Sealed this

Seventeenth Day of January, 2006

JON W. DUDAS
*Director of the United States Patent and Trademark Office*